United States Patent
Finkelstein et al.

(10) Patent No.: US 6,194,042 B1
(45) Date of Patent: *Feb. 27, 2001

(54) HIGH BARRIER CLOSURE LINER WITH OXYGEN ABSORBING CAPABILITIES

(75) Inventors: Harvey Finkelstein, Hewitt, NJ (US); Bruce Burns, Washingtonville; Victor Flores, Bridge, both of NY (US); Richard McKenna, Oceanport; Anatoly Verdel, Fair Lawn, both of NJ (US)

(73) Assignee: Tri-Seal Holdings, Inc., Somerville, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,917

(22) Filed: Jul. 10, 1997

(51) Int. Cl.[7] .................... B29D 22/00; B29D 23/00; C01B 3/00; B65D 53/00

(52) U.S. Cl. ............ 428/36.5; 428/36.6; 428/36.91; 428/66.4; 428/322.7; 215/348; 252/188.28

(58) Field of Search .................................. 215/228, 261, 215/347, 348; 206/484.1, 484.2; 252/188.28; 428/66.4, 35.7, 36.5, 36.6, 36.91, 319.7, 322.7

(56) References Cited

U.S. PATENT DOCUMENTS

| | | |
|---|---|---|
| 4,048,361 | 9/1977 | Valyi ........................... 428/35 |
| 4,279,350 | 7/1981 | King ............................ 215/228 |
| 4,287,995 | 9/1981 | Moriya ....................... 215/228 |
| 4,391,863 | 7/1983 | Bonis ........................... 428/35 |
| 4,451,512 | 5/1984 | Yazaki et al. ............... 428/36 |
| 4,528,219 | 7/1985 | Yamada et al. ............. 428/35 |
| 4,536,409 | 8/1985 | Farrell et al. ............... 426/398 |
| 4,564,541 | 1/1986 | Taira et al. .................. 428/35 |
| 4,702,966 | 10/1987 | Farrell et al. ............... 428/500 |
| 4,756,436 | 7/1988 | Morita et al. ............... 215/228 |
| 4,807,745 | 2/1989 | Langley et al. ............. 206/245 |
| 4,840,280 | 6/1989 | Schvester .................... 215/228 |
| 4,980,211 | 12/1990 | Kushida et al. ............. 428/36 |
| 5,057,365 | * 10/1991 | Finkelstein ................. 428/344 |
| 5,073,420 | 12/1991 | Yano et al. .................. 428/35 |
| 5,143,763 | 9/1992 | Yamada et al. ............. 428/36.2 |
| 5,232,754 | * 8/1993 | Waugh ........................ 428/367 |
| 5,238,718 | 8/1993 | Yano et al. .................. 428/35 |
| 5,346,735 | * 9/1994 | Logan et al. ................ 428/36.7 |
| 5,350,622 | * 9/1994 | Speer et al. ................. 428/215 |
| 5,413,827 | 5/1995 | Brodie, III et al. ......... 428/35.7 |
| 5,472,753 | 12/1995 | Farha .......................... 428/35 |
| 5,492,742 | 2/1996 | Zenner et al. ............... 428/35.2 |

(List continued on next page.)

Primary Examiner—Joseph D. Anthony
(74) Attorney, Agent, or Firm—Stroock & Stroock & Lavan LLP

(57) ABSTRACT

In order to provide a liner which can be used in place of existing type liners used in a closure for a container, a multiple layer liner sheet is coextruded in a manner wherein the outer layers are skin layers formed of a gas permeable material. These layers enclose a gas barrier layer and a foamed layer which respectively prevent the invasion of oxygen from the ambient atmosphere and remove oxygen from the head space to safeguard the contents of the container. The foamed layer provides the liner with the required resiliency, provides space for the inclusion of an adequate amount of oxygen scavenging material, and also provides a cellular structure which allows the gas molecules the freedom to move and quickly come into contact with the oxygen scavenging material. As the gas barrier layer is formed of a material which does not readily become permanently attached to the material from which the foam layer and skin layers are formed, tie layers of adhesive are formed on either side of the gas barrier layer to ensure integrity when the coextruded sheet is formed into individual liners.

14 Claims, 3 Drawing Sheets

U.S. PATENT DOCUMENTS

| | | | | |
|---|---|---|---|---|
| 5,529,833 | * | 6/1996 | Speer et al. | 428/215 |
| 5,591,390 | * | 1/1997 | Walton et al. | 264/456 |
| 5,598,940 | * | 2/1997 | Finkelstein et al. | 215/348 |
| 5,601,200 | | 2/1997 | Finkelstein et al. | 215/348 |
| 5,615,789 | | 4/1997 | Finkelstein et al. | 215/348 |
| 5,700,554 | * | 12/1997 | Speer et al. | 428/220 |
| 5,744,056 | * | 4/1998 | Venkateshwaran et al. | 252/188.28 |
| 5,885,481 | * | 3/1999 | Venkateshwaran et al. | 252/188.28 |
| 5,934,494 | * | 8/1999 | Takashashi et al. | 215/228 |
| 5,972,452 | * | 10/1999 | Takahashi et al. | 428/40.1 |

* cited by examiner

MULTILAYER EXTRUDED PRODUCT TO COOLING, WINDING AND SPLITTING OPERATIONS

HIGH BARRIER CLOSURE LINER WITH OXYGEN ABSORBING CAPABILITIES

BACKGROUND OF THE INVENTION

1. Field of the Invention

The present invention relates to a closure liner and more specifically to a multi-layer closure liner which features gas barrier improved sealing characteristics and which includes an oxygen scavenging capacity.

2. Brief Description of the Related Art

Typically closures used in conjunction with plastic bottles are produced from commodity grade thermoplastic resins—polypropylene being presently the most popular resin due to a proper combination of physical properties and a low cost. However, such materials exhibit a relatively low resistance to permeation by gases such as air. Thus, the contents of the bottles made of this material will, irrespective of measures such as hot filling, inert gas flushing or vacuum degassing, tend to be, upon standing, exposed to atmospheric oxygen and thus subject to the possibilities of detrimental oxidation.

More specifically, oxygen which is a strong oxidizer, will chemically react with the content of the package/container and eventually will tend to make the product unusable due to chemical changes which will take place. Products which are subject to a chemical oxidation include, way of example only, foods and beverages, dyes, cosmetic products, photo chemicals and adhesives. Vitamin C is particularly susceptible to the effects of oxygen and products containing such material are prone to degradation and are apt to undergo changes in flavor, color or odor.

To overcome this drawback it has been proposed to make the bottle of a material which is less gas permeable. However, even under these circumstances, the closure member or cap can become a problem in that it is formed of a material which exhibits a lower resistance to gas permeation than the remainder of the bottle. That is to say, if a bottle or container is produced from a plastic which exhibits good gas barrier characteristics, such as PET—Polyethylene terephthalate, for example, or is made using a sophisticated multilayer material with relatively high gas barrier per unit area, then the surface area of the closure in an overall amount of the gas transmission is apt to become significant and must be given consideration.

However, due to the complexity of the process currently employed in the manufacture of plastic closures, which are mostly produced by injection molding using thermoplastic resins in multi-cavity molds, there are great technical and economical difficulties in designing a process which will allow the production of closures with suitably high gas barrier properties. Therefore, in order to reduce gas transmission rate through the closure area of the container, high-barrier liners are being used to provide a necessary seal as well as gas barrier characteristics.

Some presently used high-barrier liners are produced by the lamination of the coextruded Skin/Foam/Skin products with so-called barrier films or aluminum foil. However, this type of "passive" measure of preventing the invasion of oxygen into the interior of a container has met with only limited success and it has been accordingly proposed to actively scavenge oxygen in the head space which remains in a filled container in an effort to protect the contents of the container from the detrimental oxidizing effects of oxygen.

For example, U.S. Pat. No. 4,756,436 to Morita et al. discloses the use of a specially configured cap in which two compartments are separated from each other by a gas permeable liquid proof sheet. The lower of the two compartments contains an amount of oxygen scavenger, while the upper compartment is communicated with the head space above the liquid which is filled into the bottle, by small diameter passages. However, this arrangement while possibly being effective, is expensive to make and assemble and is not particularly suited for application with screw threads of the nature used in common plastic containers.

U.S. Pat. No. 4,287,995 to Moriya discloses a closure arrangement wherein an oxygen absorbent is disposed in a compartment which is defined below or in a layer of elastic packing material, and separated from the contents of the container by a gas permeable film. While this arrangement may be less complex and therefore less expensive to manufacture that than discussed above, it does not exact any measures which totally prevent the invasion of gas from outside of the container and therefore has not been totally successful in protecting the contents of the container from exposure to oxygen over prolonged periods of storage.

U.S. Pat. No. 4,279,350 to King teaches an oxygen scavenging system wherein a catalyst is used to convert oxygen, which has passed through a gas permeable water proof layer, into water, which is then trapped by the water proof layer. This arrangement is also devoid of measures to prevent the invasion of oxygen from outside of the vessel or container, and thus has tended to be less efficient than desired over prolonged periods of time.

U.S. Pat. No. 4,840,280 to Schvester discloses the provision of a layer of material containing an oxygen absorber and the provision of a film of polydialkyl siloxane to prevent the oxygen absorbing layers from direct contact with liquid stored in the vessel. Again there is no effort to prevent the invasion of external oxygen and only the oxygen which remains in the head space immediately after filling is considered.

Accordingly, there has not been any successful proposal of a commercially feasible low cost easy to produce liner which can be readily used in place of existing liners and which will a) prevent the ingress of oxygen containing air, and b) scavenge undesirable oxygen in the head space above the product filled into a vessel or container.

SUMMARY OF THE INVENTION

It is an object of the present invention to provide a high barrier closure liner having a multilayer polymer structure which can be obtained using simultaneous extrusion of individual polymers and their admixtures through common co-extrusion hardware.

It is a further object of the present invention to provide a high barrier multilayer closure liner which can be produced by either laminating or more preferably simultaneously extruding a plurality of different polymers in a manner wherein the layers include a gas barrier layer and preferably an oxygen absorbing agent containing layer.

It is yet another object of the invention to provide a multilayer closure liner wherein a foamed or cellular layer which is used to endow resiliency on the liner, is, in the preferred embodiments, also used to house the oxygen absorbing agent and thus improve the manner in which oxygen can be removed from the interior of the container.

In order to accomplish the above and other objects and to provide a liner which can be used in place of existing conventional liners used in a closure for a container, a multiple layer liner sheet is coextruded in a manner wherein the outer layers are skin layers formed of a gas permeable material. These layers enclose a gas barrier layer and one or more foamed layer which isolate the gas barrier layer which prevents the invasion of oxygen from the ambient atmosphere. An oxygen scavenging agent is preferably incorporated into a foam layer to remove oxygen from the head space to safeguard the contents of the container. The foamed layer(s) provides the liner with the required resiliency, the volume for the inclusion of an adequate amount of oxygen absorbing material, and also provides a cellular structure which allows the gas molecules the freedom to move about and quickly come into contact with the oxygen scavenging material. In a preferred embodiment, as the gas barrier layer is formed of a resin which is not melt-compatible with the materials which the foam layer and skin layers are formed of, tie layers of adhesive are extruded on either side of the gas barrier layer to ensure integrity when the coextruded sheet is formed into individual liners.

More specifically, a first aspect of the invention resides in a multi-layer liner for a container closure comprising: a first skin layer formed of a first material which exhibits gas permeability; a gas barrier layer formed of a second material which exhibits a low gas permeability; a foam layer, which can include an oxygen scavenging agent and which is formed of a third gas permeable material and; and a second skin layer formed over the foam layer to protect the foam layer from direct contact with a product in the container, the second skin layer being formed of the first material or alternatively of another different material as the case demands.

A second aspect of the invention resides in a method of forming a liner comprising first, second, third, fourth, fifth and sixth layers; which comprises the steps of: forming the first layer of a first material which exhibits gas permeability so as to create a first external skin layer; forming the second layer of a second material which exhibits a low gas permeability to create a gas barrier layer; forming the third layer as a first adhesive layer between the first skin layer and the gas barrier layer in a manner to secure the first skin layer to the gas barrier layer; forming the fourth layer as a foam layer of a gas permeable material which preferably but not necessarily includes an oxygen scavenging agent; forming the fifth layer as a second adhesive layer between the gas barrier layer and the foam layer to secure the gas barrier layer to the foam layer; and forming the sixth layer as a second skin layer of the first material or another gas permeable material so as to cover the foam layer and to protect the foam layer from direct contact with the product.

A third aspect of the invention resides in a liner for a container closure, comprising: first, second, third, fourth, fifth and sixth layers which are simultaneously coextruded; the first layer being formed of a first material which exhibits gas permeability so as to create a first external skin layer; the second layer being formed of a second material which exhibits a low gas permeability to create a gas barrier layer; the third layer being formed as a first adhesive layer between the first skin layer and the gas barrier layer in a manner to secure the first layer to the gas barrier layer; the fourth layer being formed as a foam layer of a gas permeable material, the fourth foamed layer being capable of including an oxygen scavenging agent; the fifth layer being formed as a second adhesive layer between the gas barrier layer and the foam layer to secure the gas barrier layer to the foam layer; and the sixth layer being formed as a second skin layer of the first material or another gas permeable material so as to cover the foam layer and to protect the foam layer from direct contact with the product.

The invention is such that the combination of the gas barrier, controlled compressibility of the lining material, the ability of the lining to absorb oxygen from the headspace and the advantages derived from the combination of the cellular layer and oxygen scavengers, provides a unique combination of properties which find application in packaging products which are apt to undergo oxidation when exposed to environmental oxygen or the oxygen contained in the headspace of the sealed package.

Co-extrusion is the most economical process via which the gas barrier and the oxygen absorbing structure can be manufactured. This technique allows the manufacture of the structure in a single-step process and advantageously involves purchasing of individual resins rather than semi-finished products. However, the invention is not limited to formation via extrusion and it remains within the scope of the invention to produce the inventive structure using a laminating or similar type of technique.

The lining material according to the present invention can also be used on any closure which permits the installation of a liner, and there is no need to change the closure design or the existing manufacturing process.

BRIEF DESCRIPTION OF THE DRAWINGS

The various features and advantages of the present invention will become more clearly appreciated as a detailed description of the embodiments of the present invention is given with reference to the appended figures wherein.

DETAILED DESCRIPTION OF THE PREFERRED EMBODIMENTS

Figure 1:
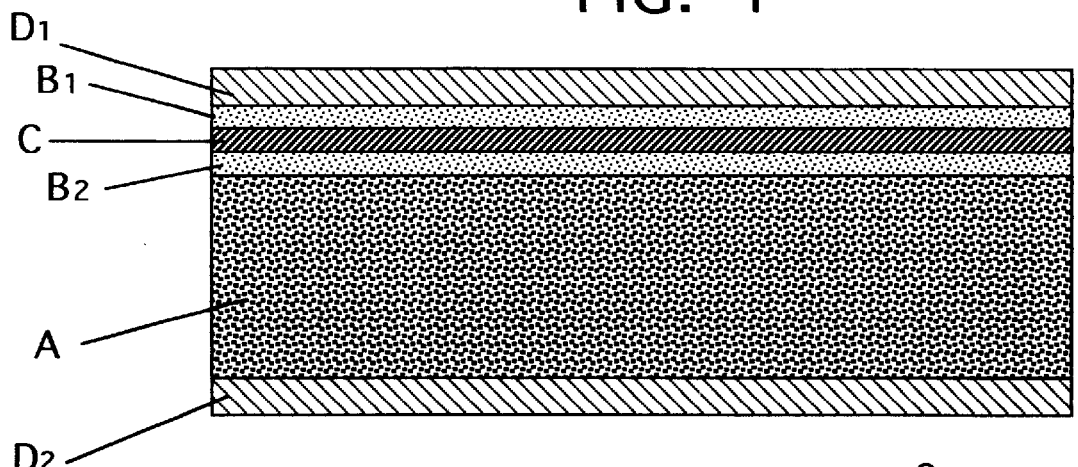
FIG. 1 is a schematic cross-sectional view of a liner according to an embodiment of the present invention.

FIG. 1 is a schematic sectional view showing the structure of a closure liner in accordance with a first embodiment of the present invention. As will be appreciated from this figure, the overall construction of the high barrier closure liner is a multilayer polymer structure. In accordance with the invention this layer structure is obtained by simultaneous extrusion of individual polymers and their admixtures through common co-extrusion hardware. The configuration of the layers can be represented by the following scheme:

$D_1/B_1/C/B_2/A/D_2$

The approximate thickness of the individual layers in this embodiment is:

Layer $D_1$–0.002"

Layer $B_2$–0.001"

Layer C–0.001"

Layer $B_2$–0.001"

Layer A–0.023"

Layer $D_2$–0.002"

Each of the layers and their function will now be discussed.

LAYERS D

These layers function as external or "skin" layers and are such as to protect internal layers of the structure from direct contact with the contents of the container. These layers also provide the necessary surface friction to assure that proper application and removal torques occur during the packaging process and at the time when consumer opens the container.

It will be noted that the application torque is related to the torque which is applied to the closure by an automatic capping equipment. In most practical applications it is preferred that this torque is high enough to prevent the closure or cap from unthreading itself in a manner which can result in the closure becoming loose and loosing sealing during shipping and/or storage.

On the other hand, the removal torque is that which needs to be applied to the closure in order to unthread it from the container neck, and should be low enough to allow a consumer to open the container using manual manipulation without using any tools or levers.

In some instances liners are maintained in position in the closure by friction fit while in other instances they are glued in place. In the instance that the liners are to be glued in position in the closure member, the skin which is in direct contact with the closure member is subject to a hot-melt adhesive application to improve the retention of the liner inside the closure during transport and package assembly. Further, in the instances that the skin layers are formed using an extrusion technique, the liner exhibits improved flatness due to the symmetry which is possible using this type of technique.

A further important feature of these outer skin layers is that they protect the oxygen scavenging additive(s), which will be discussed in more detail hereinafter, from being prematurely activated by the environmental moisture during manufacturing, shipping and fabrication of the lining.

It is also within the scope of the present invention that these outer layers can be formulated with a re-seal feature which will result in closure or sealing of any punctures which occur as a result of an sharp instrument, such as a hypodermic needle for example, being driven therethrough in order to withdraw all or part of the content of the container.

The outer skins or layers are preferably produced using polyolefin resins such as low or high density polyethylene, polypropylene, ethylene vinyl acetate copolymers, or the admixtures thereof. Alternatively, they can also be produced using thermoplastic elastomers which can be described generally as particles of a cross-linked rubber suspended in a thermoplastic resin. These type of materials are sold under the trade names of Santoprene (supplied by Advanced Elastomer Systems), Sarlink (supplied by DSM) etc. These latter mentioned thermoplastic elastomers typically have better elasticity and elastic recovery properties than polyolefin resins and can be especially useful when there is a need for recovery after a liner has been penetrated by a needle or the like and for certain applications requiring the liner to be able to conform/adapt to imperfections in the container's neck/mouth.

It should be noted that there is no requirement that the two layers $D_1$ and $D_2$ be made of the same material. While production may be facilitated by using the same material, the present invention is by no way limited to such a construction and it is possible that the layer which is exposed to the head space in the vessel or container is made of a material which is different from that which is in contact with the underside of the closure member (e.g. cap) and that the physical properties of the two layers can be tailored to optimally meet the different media to which they are respectively exposed.

LAYER C

Layer C is a gas barrier layer. In light of the above mentioned fact that most commodity grade thermoplastic material widely used in a modern packaging industry has a relatively high gas transmission rate, which is true for all the polyolefin resins, their copolymers and admixtures as well as styrenic polymers such as polystyrene or ABS, it is essential, in the instances wherein gas transmission in or out of the container is undesirable, to incorporate in a thin layer of gas barrier type material into the liner.

Accordingly, the functions of this barrier layer in a co-extruded structure are to prevent:

environmental oxygen from traveling through the lining material in a container.

the oxygen scavenging additive (specific description of which will follow) from absorbing environmental oxygen rather than the oxygen which is contained in a space between the top filling line of the container and the closure (the head space).

volatile products other than oxygen (e.g. carbon dioxide, nitrogen, chemical complexes representing aroma, flavor of particular packaged products) from traveling through the lining material.

Polymers which can be used to form the gas barrier layer can be classified as "glassy" polymers. They typically have a high level of crystallization. Generally, orientation and crystallization of the polymers improves the barrier properties of the material as a result of the increased packing efficiency of the polymer chains. The barrier properties of polymeric materials are determined by the chemical structure of the chain and the system morphology. Some of those commercially available polymers which can be used are:

Polyethylene terephthalate (PET). This polymer is widely used presently for the production of containers where the gas transition properties are important. It is very actively used for manufacturing of containers designed for the packaging of carbonated beverages. Typically, 0.001" thick film prepared from PET has an oxygen transmission rate of about 5 cc/100 sq.in/day atm.

Polyvinylidene chloride (PVDC). This polymer is sold under the trade name of Saran and is used for high-barrier films in the co-extruded structures. The oxygen permeability of this polymer at a thickness of 0.001" is approximately be 1.2 cc/100 sq.in/day atm.

Polyethylene Naphthalate (PEN) is similar in chemistry to PET but offers 4 to 5 times better gas transmission barrier characteristics than PET.

Ethylene vinyl alcohol copolymer (EVOH). This polymer is presently used for the manufacture of multi-layer bottles, co-extruded films and laminated flexible packaging items. Oxygen permeation of a 0.001" thick film will vary from 0.01 to 1.2 cc/100 sq.in./day atm depending on the particular grade of resin being used and the ambient conditions.

Each of the above mentioned polymers is available in different grades with different viscosity and some differences in properties. Nevertheless, any can serve as a gas barrier layer in a multi-layer structure due to the fact that a low density polyethylene film at the thickness level of 0.001" will have an oxygen transmission rate of about 420 cc/100 sq.in/day atm while polypropylene will typically exhibit a value of about 150 cc/1100 sq. in/day atm. The selection of the particular polymer to be used as the barrier polymer will be dictated by the specific characteristics of the product packaged.

LAYER A

Layer A in the structure is a foam layer with an oxygen scavenging additive in its composition. For a liner to provide the necessary seal between the closure and the associated container, the liner must exhibit a predetermined amount of resiliency. This is obtained by the creating of a cellular structure in the polymer.

This foam or cellular layer is obtained by the blending a so-called chemical blowing agent into the formulation. One example of such an agent presently used in the plastics processing industry is azodicarbonamide. This material is presently produced and sold by several different companies under the Trade names Celogen, Ficel, Genitron, Azocel, etc. There are, of course, other chemicals which can be used to create cellular structure in plastic articles. Examples of those products will include, polycarbonic acids in combination with bicarbonate salts (sodium bicarbonate), 4,4'-oxybis (benzenesulfohydrazide), trihydrazinotriazine and others.

These chemical blowing agents are materials which, upon exposure to an elevated temperature in the extruder's barrel, will decompose and evolve gaseous compounds. These gases, when blended with plastic and extruded through the die, will create multiple voids distributed consistently throughout the polymer. As the blend of dissolved gas and molten plastic exits the die, the pressure difference between the pressure inside extruder's barrel and the environment will result in the expansion of each individual cell, and thus create a polymer foam, or a product which includes multiple voids.

The ratio of the volume of voids and the volume of plastic in the foamed structure will determine the product's density, at least as far as specific weight per unit of volume is concerned. This ratio or proportion will also determine physical properties of the foamed polymer—its elasticity, compressibility, compression set etc. Physical properties of the foam produced will depend on the particular polymer or the admixture of polymers which was blended with the chemical blowing agent prior to extrusion. Typically, the polymers and their admixtures used in a preparation of the foamed layer in the embodiment of the invention can be identified as polyolefin. A more specific description of the polymers, such as ethylene vinyl acetate, polypropylene, polyethylene and their admixtures, used in the preparation of the foam layer can be found in U.S. Pat. Nos. 5,601,200; 5,615,789 and 5,598,940, which are hereby incorporated by reference.

In accordance with the present invention the foamed layer also serves as a carrier for an oxygen scavenging additive.

The oxygen scavenging additive is a chemical which, when activated by moisture, starts a chemical reaction with oxygen which generates products that do not contain oxygen. Therefore, during this chemical reaction oxygen is consumed. The consumption of oxygen from the sealed container will dramatically reduce oxygen content in the space between the upper filling line of the container and closure (viz., the head space).

Examples of materials which can be used as the oxygen scavenging agent are:
  Salicylic acid chelate or a complex of a transition metal or salt thereof (U.S. Pat. No. 5,492,742).
  Potassium sulfite or an interacting mixture of potassium acetate and sodium sulfite (U.S. Pat. No. 4,536,409).
  Ferrous salts such as ferrous sulfate and ferrous chloride, reducing sulphur compounds such as dithonite, ascorbic acid and/or their salts, reducing organic compounds such as catechol and hydroquinone (mentioned in U.S. Pat. No. 4,756,436).

The combination in the lining of the high gas barrier feature and the oxygen absorbing capability makes this product a significant improvement over all existing lining material, including gas barrier liners. The present invention enables the reduction of the amount of oxygen entering the container as well as the marked reduction of the oxygen content within the sealed container, thus increasing the shelf life of the product and content quality over prolonged periods of time.

LAYERS B

The B (viz., $B_1$ and $B_2$)layers are each an adhesive layer or a tie layer. The layers which are used for the skins (the outside layers) are olefinic in chemistry, as is the foam layer. Barrier polymers are non-olefinic material and usually polar in nature. High adhesion levels can be obtained between two polyolefin materials (polyethylene and ethylene vinyl acetate) when they are extruded simultaneously through the common co-extrusion hardware as individual layers. However, in the case of a polar polymers and non-polar polymers (such as a polyolefin) the same adhesion level cannot be obtained due to non-similarities in the chemical structure. Thus, even though, products of co-extrusion of the barrier polymer (EVOH, for example) and polyolefin (Polyethylene) can be obtained, they will only have a low commercial value due to the fact that they will tend to separate during the fabricating operations (winding, die-cutting, forming, etc.).

Therefore, the tie layers $B_1$ and $B_2$ are used in order to increase the bond level between polar and non-polar polymers being used. The polymers used in these tie layers are typically functionalized polyolefins with the ability to create a high level permanent bond with polyolefin resins as well as with polar resins.

Examples of these adhesive products come in the form of a line of functionalized polyolefins sold under the trade name Plexar by Millennium Petrochemicals (formerly Quantum Chemicals). These products are designed to be used in a co-extrusion process which involves EVOH as one of the layers and polyolefin resins as others. Depending on the chemistry of the particular grade of an EVOH resin, Plexar resin grade can be offered to obtain a necessary level of bond strength between the EVOH layer and the polyolefin layer. Other products which can be used as an adhesive are sold under the trade names Bynel (E.I. du Pont de Nemours Co.), Admer (Mitsui Petrochemical Industries, Ltd.). Depending on the particular barrier polymer used in the structure, adhesive resins which can be used to achieve the desired bond levels will include ethylene vinyl acetate, ethylene acrylic acid copolymers (sold under trade names Primacor by Dow Chemical or Nucrel by Du Pont).

The high barrier liner with oxygen absorbing capabilities of the present invention represents a unique combination of properties, which allows it not only to restrict the oxygen from penetrating into container, but also to reduce oxygen content in the headspace. Prior efforts relating to the oxygen scavenging technology have been mostly directed to different types of oxygen absorbing articles which are installed in the closure. This technology allows the reduction of the oxygen level in the headspace, but requires a number of separate operations to be used in order to assemble the closure system. This also requires the manufacture of individual oxygen scavenging articles, which increases the cost of the finished product which can be used as a closure with oxygen scavenging capabilities. Use of the oxygen scavenging additives in flexible packaging items is also mentioned in the prior art, but none of the products previously developed feature an oxygen scavenging additive used in a foamed polyolefin layer of the structure.

There are multiple advantages to combining the oxygen scavenging properties with the cellular structure of the polymer foam.

The foam layer is the thickest layer in the co-extruded lining material. The thickness of the foam layer is preferably about 0.021–0.023" in comparison with 0.001" or 0.002" of the other layers of materials used. The relatively high volume of the foamed layer in the structure allows a much higher loading of the oxygen absorbing additive per each individual package (sealed container) as compared to loading which could be achieved with layers which are only 0.001" or 0.002" thick. The higher loading of the oxygen scavenging additive will allow for a larger volume of oxygen to be absorbed per each individual container.

The physical structure of the foam improves the flow of oxygen throughout the layer and offers much less resistance to gas penetration than in case of a solid plastic layer.

The cellular structure with individual oxygen absorbing particles suspended therein, allows the oxygen better access to the particles thus enabling a higher absorbing efficiency than in case of solid polymers.

As pointed out above, the combination of the gas barrier, controlled compressibility of the lining material, its ability to absorb oxygen from the headspace and advantages derived from the combination of the cellular layer and oxygen scavengers, provides properties which are extremely useful in the packaging of products which are subject to ready oxidation by the environmental oxygen or the oxygen contained in the headspace of the sealed container.

Co-extrusion is the most economical process which can be employed in manufacturing of the gas barrier and oxygen absorbing structure. It allows the manufacture of the structure in a single-step process and involves purchasing of individual resins rather than semi-finished products. This lining material can also be used on any closure which permits the installation of a liner, and there is no need to change the closure design or the existing manufacturing process as different from the oxygen absorbing elements individually installed in closures found in U.S. Pat. Nos. 4,756,436; 4,287,995; 4,279,350 or 4,840,280).

Figure 2:
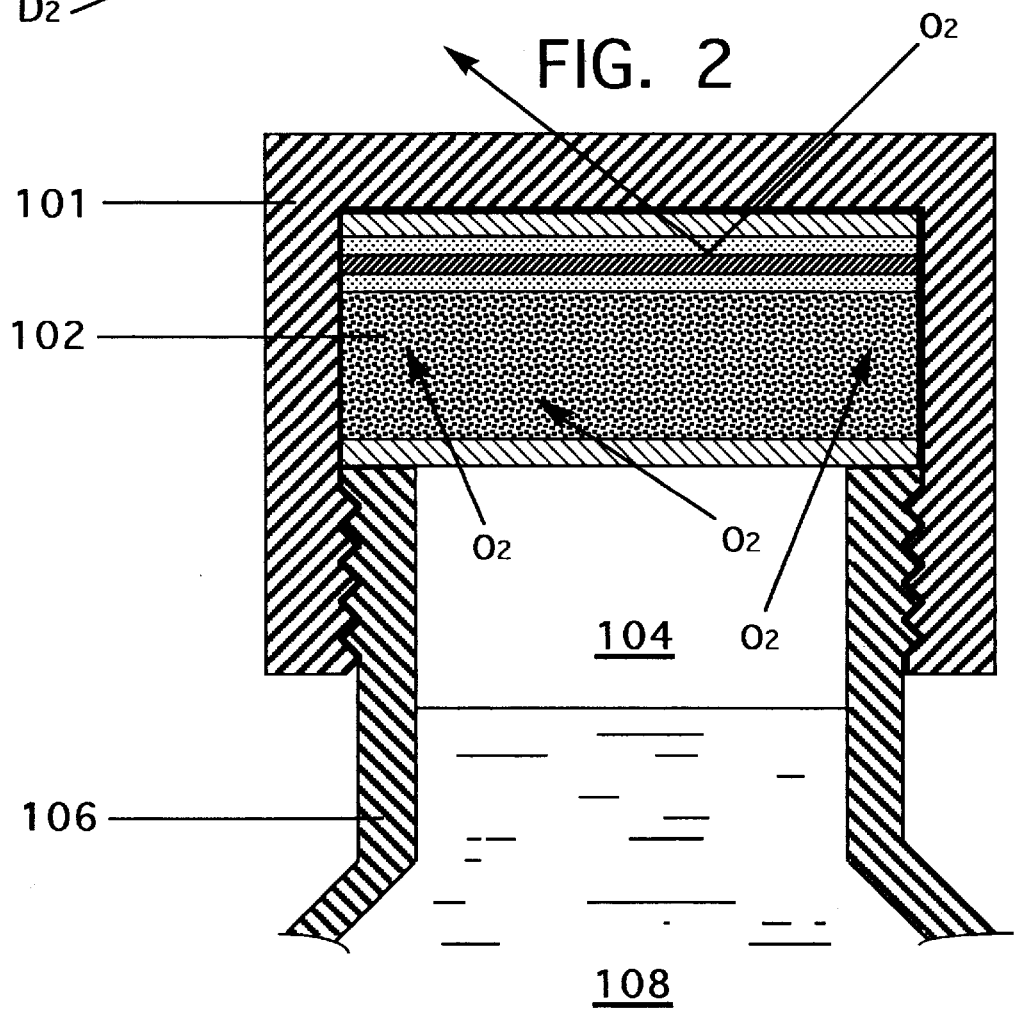
FIG. 2 a schematic cross-sectional view showing the liner according to the present invention disposed in a closure member which is threaded into a sealing position on the neck of a bottle or the like type of container.

FIG. 2 schematically shows a screw top type closure 101 provided with a liner 102 having the construction depicted in FIG. 1. As schematically shown in this figure, the oxygen in the head space 104 defined within the container 106 by the fill or contents 108 (in this case a liquid) is absorbed into the foam layer A while external oxygen contained in the ambient atmosphere is prevented from invading the vessel by layer C. It will of course be appreciated that FIG. 2 is not drawn to scale and the thickness of the liner is exaggerated for the sake of illustration.

Figure 3:
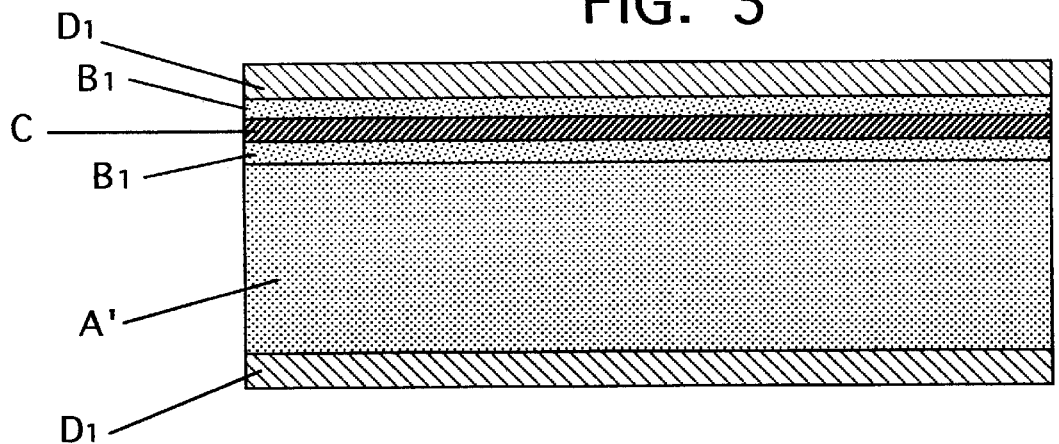
FIG. 3 is a schematic cross-sectional view of a liner according to a second embodiment of the invention.
Figure 4:
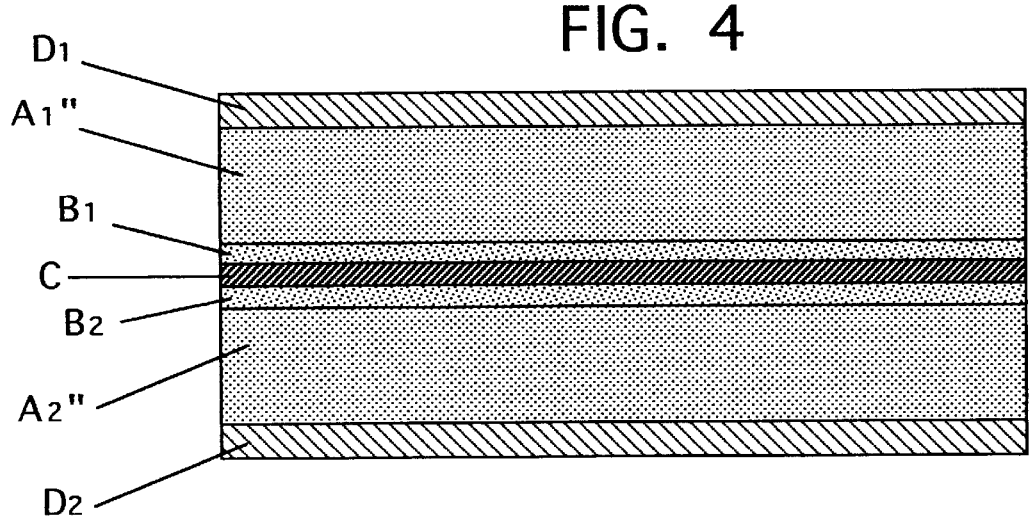
FIG. 4 is a schematic cross-sectional view of a liner according to a third embodiment of the invention which features a double foam layer construction.
Figure 5:
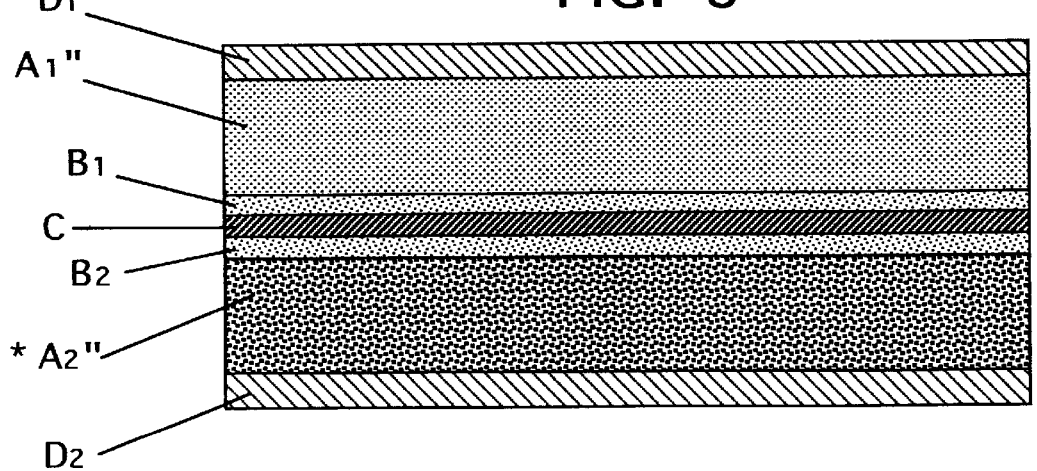
FIG. 5 is a view similar to that shown in FIG. 5 wherein one of the two foam layers is impregnated with an oxygen scavenging agent.

FIGS. 3 to 5 show second to fourth embodiments of the present invention. The structure shown in FIG. 3 is essentially similar to that which is shown in FIG. 1 but differs in that the layer A' does not include an oxygen scavenging agent and is such as to rely on the provision of the gas barrier layer C to prevent the intrusion of environmental oxygen into the container by way of a gas permeable closure member.

The third embodiment of the invention shown in FIG. 4 features an arrangement wherein the gas barrier layer C, which tends to be sensitive to humidity/moisture, is protectively isolated by being sandwiched between two foam layers $A_1"$ and $A_2"$. It will of course be understood that the thickness of the layers $A_1"$ and $A_2"$ is not limited to that depicted in the FIG. 4 and that this may be varied as deemed appropriate. Further, the second layer $*A_2"$ can be impregnated with an oxygen scavenging agent if so desired such as shown in FIG. 5.

Figure 6:
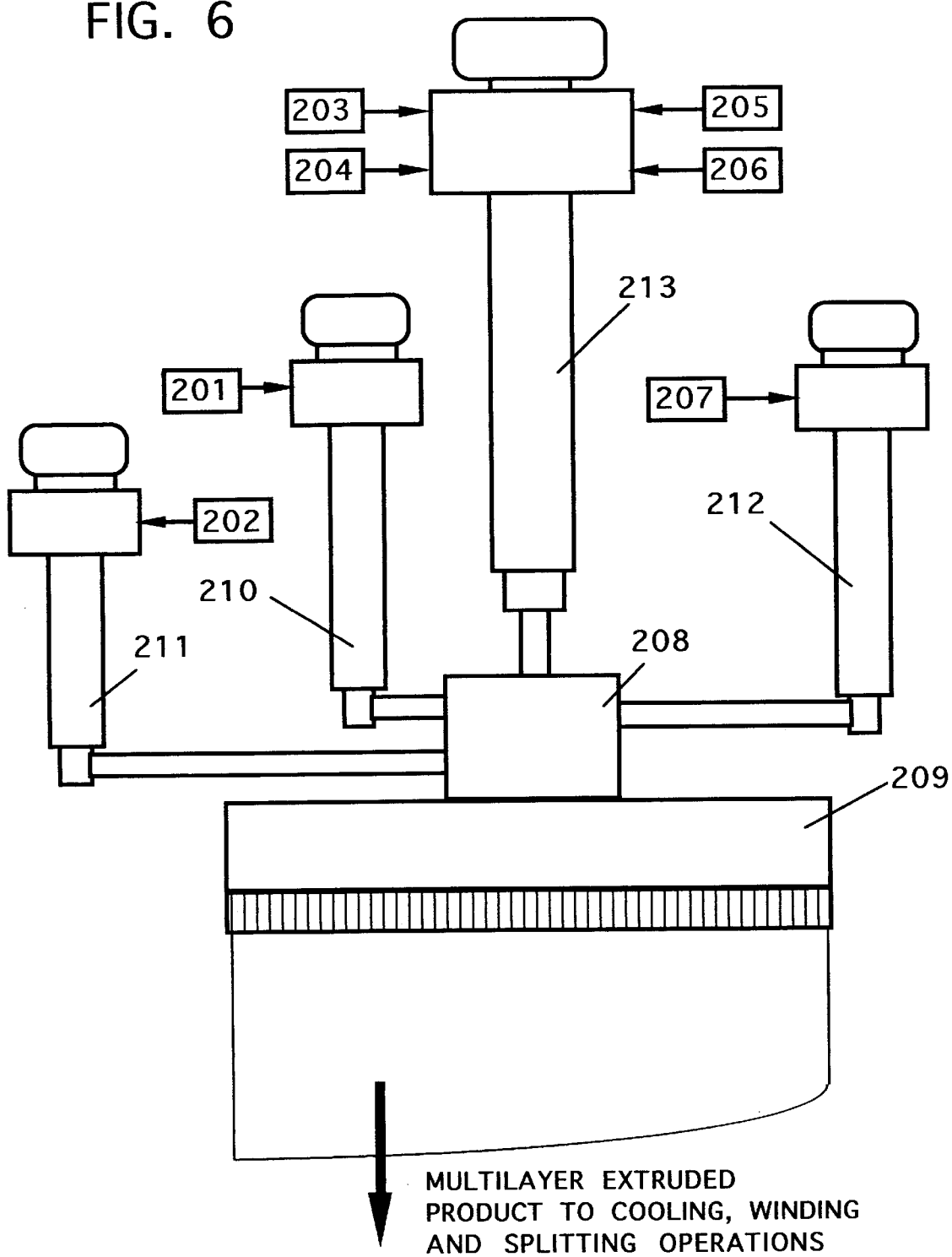
FIG. 6 is a diagram schematically showing an example of a coextrusion arrangement by which the liner structures shown in FIGS. 2, 3, 4 and 5 can be manufactured.

FIG. 6 diagrammatically depicts the manner in which coextrusion of the different layers which are shown in FIGS. 1 to 4 is carried out. As shown, each of the individual resins or agents are supplied from the plurality of sources schematically depicted by 201 to 207, to the individual extruders 210 to 213. The flow of molten polymer from each individual extruder is pumped via connection lines to the co-extrusion feedblock 208. In the feedblock 208, the flows of the individual materials are arranged into a multilayer structure of the nature depicted in any one of the arrangements illustrated in FIGS. 1, 3 to 5. The multilayer structure once formed enters an extrusion die 209 wherein it is squeezed and spread to form a multilayer plastic product in sheet form. The product is then cooled and wound into rolls. Slitting of the product in customer-specified widths can take place prior to winding or as a separate operation dependent on the process and product that is required. Depending on the client's requirements, rolls of the finished product can be transferred to the client's plant where the operation of punching the individual liners and their subsequent disposition in closures (caps) takes place.

Alternatively, the feedblock 208 can be eliminated if the extrusion die is arranged to handle multilayer flow (viz., is a multimanifold die), or a combination of the feedblock and a multimanifold die can be used to produce the required co-extruded structure.

Although the invention has been described in terms of only a limited number of embodiments and examples, the various changes and variations which can be made without departing from the scope of the invention, which is limited only the appended claims, will be readily appreciated by those skilled the art to which this invention pertains. For example, it is possible that the multilayer structure be formed using a laminating technique wherein the sheet materials are prepared and are assembled into the desired structure in a separate operation.

It is also possible that the gas barrier layer be omitted. That is to say, in the case that the closure is made of a material which exhibit low gas permeability, or is otherwise provided with some measure by which gas infiltration is prevented, or alternatively, the situation is does not require the provision of gas exclusion, for example, it is within the scope of the present invention to omit the gas barrier layer C.

What is claimed is:

1. A method for forming a liner for use with a container closure, the method comprising the steps of:

providing a polymer gas barrier material in resin form;

providing first and second skin materials in resin form;

providing foam materials for forming a foam layer;

providing an adhesive in resin form;

coextruding simultaneously said gas barrier material, said first and second skin materials, said foam materials, and said adhesive to form a multi-layer sheet, wherein said foam materials coact to form a foam layer, said gas barrier material is adjacent to said adhesive, and said foam layer and said gas barrier material are between first and second skin layers; and, cutting said multi-layer sheet to a predetermined size to form the liner for use with the container closure.

2. A method as set forth in claim 1, wherein said adhesive is disposed at least between said gas barrier material and said first skin layer.

3. A method as set forth in claim 1, wherein said adhesive is disposed between said gas barrier material and said foam layer.

4. A method as set forth in claim 1, wherein said foam materials are coextruded so as to form at least two layers, and wherein said gas barrier material is between two of said foam layers.

5. A method as set forth in claim 1, wherein said first and second skin materials are the same material.

6. A method as set forth in claim 1, wherein at least one of said skin materials comprises a material selected from the group consisting of: a high or low density polyethylene, polypropylene, ethylene vinyl acetate (EVA), and admixtures thereof.

7. A method as set forth in claim 1, wherein said gas barrier material comprises a material selected from the group consisting of: polyethylene terephthalate (PET), polyvinylidene chloride (PVDC), polyethylene naphthalate (PEN), and ethylene vinyl alcohol copolymer (EVOH).

8. A method as set forth in claim 1, wherein said gas barrier material has an oxygen transmission rate of less than or equal to 5.0 cc/100 sq. in./day atm. at a thickness of 0.001".

9. A method as set forth in claim 1 further comprising the step of providing an oxygen scavenging agent with said foam materials so that said oxygen scavenging agent is dispersed throughout said resulting foam layer.

10. A method as set forth in claim 9, wherein said oxygen scavenging agent is selected from the group consisting of: salicylic acid chelate or a complex of a transition metal or salt thereof, potassium sulfite or an interacting mixture of potassium acetate and sodium sulfite, ferrous salts including ferrous sulfate and ferrous chloride, reducing sulfur compounds including dithonite, ascorbic acid and/or their salts, reducing organic compounds including catechol and hydroquinone.

11. A method for forming a liner for use with a container closure, the method comprising the steps of:

providing first and second skin materials in resin form;

providing foam materials for forming a foam layer;

providing an oxygen scavenging agent;

mixing said oxygen scavenging agent with said foam materials;

coextruding simultaneously said first and second skin materials and said foam materials to form a multi-layer sheet, wherein said foam materials coact to form a foam layer having said oxygen scavenging agent dispersed therethroughout, and wherein said foam layer is between first and second skin layers; and, cutting said multi-layer sheet to a predetermined size to form the liner for use with the container closure.

12. A method as set forth in claim 11, wherein said oxygen scavenging agent is selected from the group consisting of: salicylic acid chelate or a complex of a transition metal or salt thereof, potassium sulfite or an interacting mixture of potassium acetate and sodium sulfite, ferrous salts including ferrous sulfate and ferrous chloride, reducing sulfur compounds including dithonite, ascorbic acid and/or their salts, reducing organic compounds including catechol and hydroquinone.

13. A method as set forth in claim 11, wherein at least one of said skin materials comprises a material selected from the group consisting of: a high or low density polyethylene, polypropylene, ethylene vinyl acetate (EVA), and admixtures thereof.

14. A method as set forth in claim 11, wherein said first and second skin materials are the same material.

\* \* \* \* \*